(12) United States Patent
Amento et al.

(10) Patent No.: US 11,637,872 B2
(45) Date of Patent: *Apr. 25, 2023

(54) SYSTEMS AND METHODS FOR ALLOCATING AND MANAGING RESOURCES IN AN INTERNET OF THINGS ENVIRONMENT USING LOCATION BASED FOCUS OF ATTENTION

(71) Applicant: AT&T Intellectual Property I, L.P., Atlanta, GA (US)

(72) Inventors: Brian Amento, Port Murray, NJ (US); Robert J. Hall, Berkeley Heights, NJ (US); Kaustubh Joshi, Short Hills, NJ (US); Kermit Hal Purdy, Bernardsville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/535,107

(22) Filed: Nov. 24, 2021

(65) Prior Publication Data
US 2022/0086195 A1    Mar. 17, 2022

Related U.S. Application Data

(63) Continuation of application No. 16/564,238, filed on Sep. 9, 2019, now Pat. No. 11,218,518, which is a
(Continued)

(51) Int. Cl.
*H04L 65/1063*    (2022.01)
*H04L 12/18*    (2006.01)
(Continued)

(52) U.S. Cl.
CPC ............ *H04L 65/1063* (2013.01); *G06F 9/00* (2013.01); *G06F 9/5072* (2013.01); *H04L 12/18* (2013.01);
(Continued)

(58) Field of Classification Search
CPC ....... H04L 67/52; H04L 67/535; H04L 67/01; H04L 67/1046; H04L 67/54; H04L 67/10;
(Continued)

(56) References Cited

U.S. PATENT DOCUMENTS 9,160,754 B2    10/2015    Cao et al.
9,251,517 B2    2/2016    Bonilla et al.
(Continued)

*Primary Examiner* — Djenane M Bayard
(74) *Attorney, Agent, or Firm* — Guntin & Gust, PLC; Atanu Das

(57) ABSTRACT

A system for managing clouds of edge devices as an Infrastructure as a Service clouds includes an application server, a location based situational awareness subsystem and a cloud management subsystem. The cloud management subsystem includes a first API through which the application server makes request to the location based situational awareness subsystem and a conductor that searches for the optimal deployment of cloud resources that meet a set of constraints. A second API for managing and deploying applications on a selected set of the plurality of network connected devices. The system also includes a compute node that can interact with the selected set of the plurality of network connected devices to launch and manage containers on the selected set of the plurality of network connected devices.

20 Claims, 8 Drawing Sheets

Related U.S. Application Data continuation of application No. 15/432,042, filed on Feb. 14, 2017, now Pat. No. 10,454,977.

(51) Int. Cl.

| | |
|---|---|
| *H04L 41/5054* | (2022.01) |
| *H04L 51/214* | (2022.01) |
| *H04L 65/61* | (2022.01) |
| *H04L 41/50* | (2022.01) |
| *H04L 67/12* | (2022.01) |
| *G06F 9/50* | (2006.01) |
| *G06F 9/00* | (2006.01) |
| *H04W 4/70* | (2018.01) |
| *H04L 51/222* | (2022.01) |
| *H04L 61/5007* | (2022.01) |
| *H04L 101/69* | (2022.01) |

(52) U.S. Cl.
CPC ........ H04L 41/5054 (2013.01); H04L 51/214 (2022.05); H04L 65/61 (2022.05); *H04L 41/5096* (2013.01); *H04L 51/222* (2022.05); *H04L 61/5007* (2022.05); *H04L 67/12* (2013.01); *H04L 2101/69* (2022.05); *H04W 4/70* (2018.02)

(58) Field of Classification Search
CPC ............. H04L 41/0893; H04L 41/0894; H04L 67/12; H04L 67/60; H04L 43/16; H04L 67/104; H04L 63/08; H04L 67/55; H04L 2463/082; H04L 51/222; H04L 63/107; H04L 63/0861; H04L 67/125; H04L 65/403; H04L 41/0816; H04L 41/5054; H04L 51/046; H04L 12/18; H04L 65/1063; H04L 67/1095; H04L 67/131; H04L 2101/69; H04L 41/5096; H04L 51/214; H04L 61/5007; H04L 65/1069; H04L 65/61; H04L 65/612; H04L 65/613; H04L 9/50; H04L 63/123; H04L 67/133; H04L 9/3239; H04L 9/3263; H04L 41/5003; H04L 41/5009; H04L 41/5019; H04L 41/5025; H04L 43/08; H04L 43/0823; H04L 47/72; H04L 47/821; H04L 47/822; H04L 51/04; H04L 51/224; H04L 51/42; H04L 63/04; H04L 63/083; H04L 63/1433; H04L 67/1097

See application file for complete search history.

(56) References Cited

U.S. PATENT DOCUMENTS

| | | | |
|---|---|---|---|
| 9,357,331 B2 | 5/2016 | Huang | |
| 9,363,230 B2 | 6/2016 | Hall | |
| 9,401,977 B1 | 7/2016 | Gaw | |
| 9,432,794 B2 | 8/2016 | Agrawal et al. | |
| 2007/0124395 A1 | 5/2007 | Edge et al. | |
| 2008/0227473 A1 | 9/2008 | Haney | |
| 2009/0185514 A1* | 7/2009 | Chandra | ............... H04L 12/189 370/310 |
| 2012/0311157 A1 | 12/2012 | Erickson et al. | |
| 2013/0072223 A1 | 3/2013 | Berenberg et al. | |
| 2014/0059226 A1 | 2/2014 | Messerli et al. | |
| 2014/0067758 A1 | 3/2014 | Boldyrev et al. | |
| 2014/0378090 A1* | 12/2014 | Hall | ...................... A63F 13/812 455/404.2 |
| 2015/0131499 A1 | 5/2015 | Hall | |
| 2015/0228004 A1 | 8/2015 | Bednarek et al. | |
| 2016/0087956 A1 | 3/2016 | Maheshwari et al. | |
| 2016/0105489 A1 | 4/2016 | Llorca et al. | |
| 2016/0198003 A1 | 7/2016 | Luft | |
| 2016/0301746 A1 | 10/2016 | Bauer | |
| 2016/0307284 A1* | 10/2016 | Parsons | ................... H04L 51/52 |
| 2016/0358187 A1 | 12/2016 | Radocchia et al. | |
| 2017/0193412 A1 | 7/2017 | Easton et al. | |
| 2017/0230192 A1* | 8/2017 | Hall | ........ H04L 41/12 |
| 2017/0235616 A1 | 8/2017 | Baughman et al. | |
| 2017/0300309 A1 | 10/2017 | Berger et al. | |
| 2018/0032997 A1 | 2/2018 | Gordon et al. | |

* cited by examiner

SYSTEMS AND METHODS FOR ALLOCATING AND MANAGING RESOURCES IN AN INTERNET OF THINGS ENVIRONMENT USING LOCATION BASED FOCUS OF ATTENTION

CROSS REFERENCE TO RELATED APPLICATIONS

This application is a continuation of Ser. No. 16/564,238, filed Sep. 9, 2019, which is a continuation of U.S. patent application Ser. No. 15/432,042, filed Feb. 14, 2017 (now U.S. Pat. No. 10,454,977). All sections of the aforementioned application are incorporated herein by reference in their entirety.

TECHNICAL FIELD

The present disclosure relates generally to systems and methods for allocating and managing resources in an internet of things environment and more specifically to systems and methods for allocating and managing resources in an internet of things environment using location-based focus of attention.

BACKGROUND

The number of network connected devices is increasing at a drastic rate due in part to the internet of things (IoT), which connects small form factor devices, like vehicles, drones, set top boxes and other devices to the internet, often with substantial compute capabilities. One potential way to treat these resources is to organize them into a collection of edge clouds using traditional cloud tools to monitor and deploy applications. Despite the similarities to the traditional cloud infrastructure as a service model (IaaS model), such an approach presents many unique challenges. For starters, the edge devices in question often have very limited compute and memory, and in the case of drones, limited energy as well. Second, the network environment is dramatically different from the typical data center, complete with nodes that may be constantly moving and have intermittent connectivity with variable quality. Third, the ratio of compute to control nodes is dramatically different. With thousands to potentially millions of devices attaching to a small set of cloud controllers, the control plane must achieve very high levels of efficiency. Additionally, these devices often need mixed initiative management that is very distinct from the traditional cloud provider and the tenant separation. Specifically, in addition to the entity that manages the entire platform (e.g. cable or auto company), and the application providers that manage the applications, each edge device may also be co-managed by the end-user who actually owns it (e.g., the car or set-top box owner). The cloud platform must then not only be able to factor in the user's preferences and actions in any deployment decision making, but it also must be able to protect the overall platform from compromises of individual edge devices. Current cloud management platforms like OpenStack are designed to handle a maximum of a few thousand compute nodes, not the projected billions of IoT devices.

There is a need for cloud management tools that can efficiently handle a large number of IoT devices and overcome the mixed initiative management drawbacks of existing cloud management tools.

SUMMARY

The needs existing in the field are addressed by the present disclosure, which relates to systems, methods and computer useable media for managing large numbers of IoT devices by an intelligent geo and context-aware messaging bus that allows the "focus of attention" of the cloud control plane to be scoped based on context that includes the device location, edge device health and capabilities, and user authorization preferences.

Many of the challenges of existing cloud management tools can be addressed by an intelligent geo and context-aware messaging bus that allows the "focus of attention" of the cloud control plane to be scoped based on context that includes the device location, edge device health and capabilities, and user authorization preferences. Then, devices which are not in the current focus of attention are neither tracked by the cloud control plane, nor participate in any control plane protocols. Doing so not only allows the resource utilization of the edge devices to be minimized since they do not need to provide periodic updates to the cloud, but it also allows the cloud control plane to be more efficient and scalable, since it only needs to handle a small subset of devices at any one time. Finally, such dynamic scoping is essential for handling edge devices that are constantly moving, and may be disconnected from the network at any given time; such devices they are simply excluded from the focus of attention of the current orchestration task. The message bus also provides core security features—by only allowing authenticated nodes to communicate over the message bus and revoking their credentials if an edge device is "rooted," it protects the control plane from compromised endpoints.

In one embodiment, a method includes receiving a request to send a message to a plurality of edge devices in a target area. This aspect also includes sending a geographically addressed message to the plurality of edge devices in the target area where the geographically addressed message contains requirements of a desired resource. The method also includes receiving responses from a first subset of the plurality of edge devices that satisfy the requirements. The method also includes creating a first list of edge nodes from the responses and sending the first list of edge nodes to a constraint solving algorithm for filtering. A second list of edge nodes is created based on edge node capabilities and resource availability. The method also includes selecting a second subset of edge nodes from the second list and executing an operation based on the second list. Other embodiments of this aspect include corresponding computer systems, apparatus, and computer programs recorded on one or more computer storage devices, each configured to perform the actions of the methods.

One general aspect includes a system for managing a plurality of network connected devices including: a location based situational awareness subsystem, an application server, a cloud management subsystem in communication with the location based situational awareness subsystem and the application server. The cloud management subsystem also includes a first API through which the application server makes request to the location based situational awareness subsystem. The cloud management subsystem also includes a conductor that searches for the optimal deployment of cloud resources that meet a set of constraints. The cloud management subsystem also includes a second API for managing and deploying applications on a selected set of the plurality of network connected devices. The system also includes a compute node that can interact with the selected set of the plurality of network connected devices to launch and manage containers on the selected set of the plurality of network connected devices. Other embodiments of this aspect include corresponding computer systems, apparatus, and computer programs recorded on one or more computer storage devices, each configured to perform the actions of the methods.

Another general aspect includes a computer-readable storage medium having a tangible physical structure, the computer-readable storage medium including executable instructions that when executed by a processor cause the processor to effectuate: receiving a request to send a message to a plurality of edge devices in a target area; sending a geographically addressed message to the plurality of edge devices in the target area where the geographically addressed message contains requirements of a desired resource; receiving responses from a first subset of the plurality of edge devices that satisfy the requirements; creating a first list of edge nodes from the responses; sending the first list of edge nodes to a constraint solving algorithm for filtering; creating a second list of edge nodes based on edge node capabilities and resource availability; selecting a second subset of edge nodes from the second list; and executing an operation based on the second list. Other embodiments of this aspect include corresponding computer systems, apparatus, and computer programs recorded on one or more computer storage devices, each configured to perform the actions of the methods.

GLOSSARY OF TERMS

Figure 1:
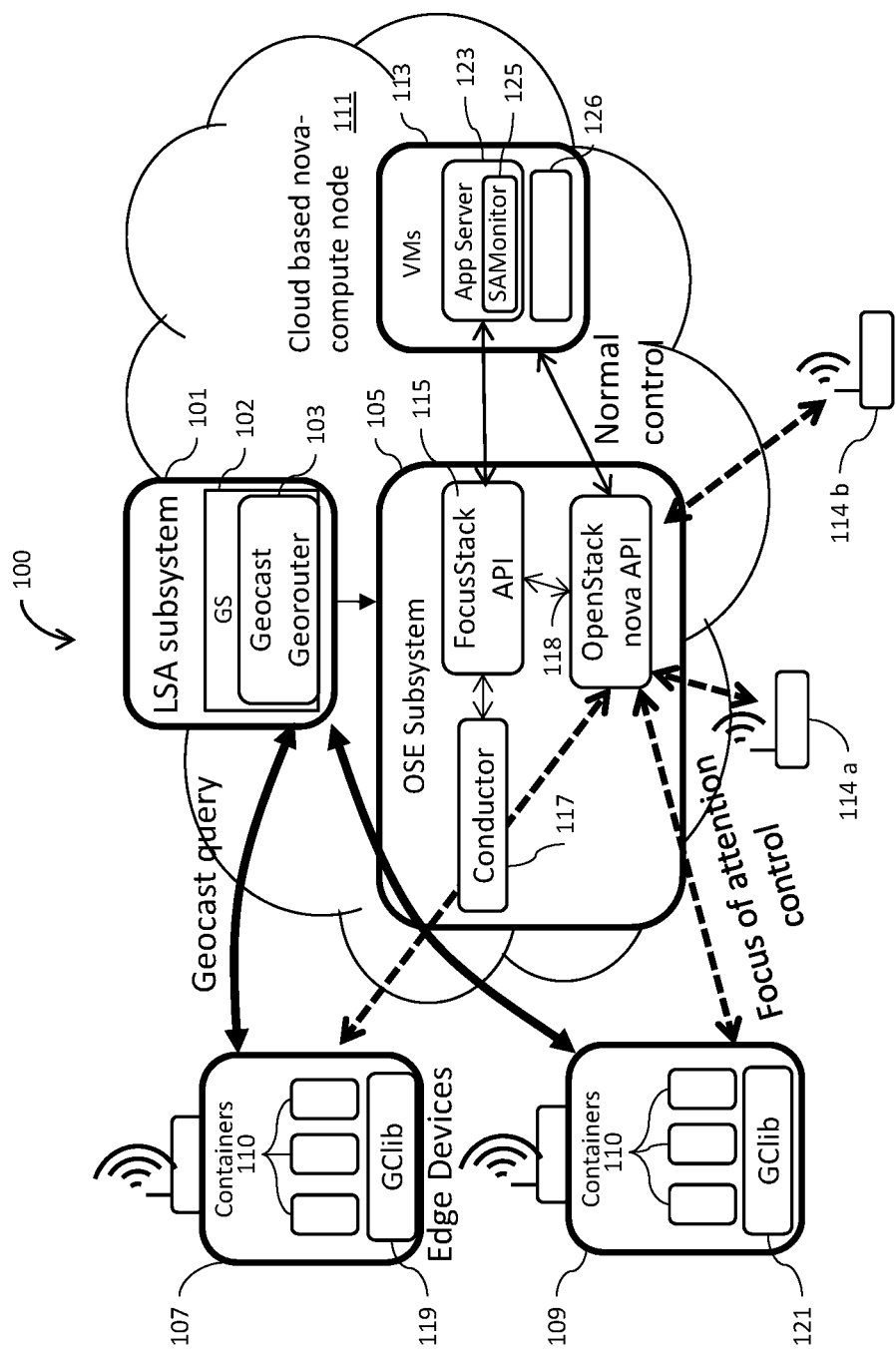
FIG. 1 is a block diagram illustrating the architecture of an embodiment of a system for orchestrating edge clouds using location-based focus of attention.

API. An application programming interface (API) is a software program that facilitates interaction with other software programs. An API allows a programmer to interact with an application using a collection of callable functions. The goal of an API is to allow programmers to write programs that will not cease to function if the underlying system is upgraded.

Bus. A Bus is a subsystem that is used to connect computer components and transfer data between them. For example, an internal bus connects computer internals to the motherboard.

CAN bus. A Controller Area Network bus (CAN bus) is a vehicle bus standard designed to allow microcontrollers and devices to communicate with each other in applications without a host computer. It is a message-based protocol, designed originally for multiplex electrical wiring within automobiles, but is also used in many other contexts.

Compute Node. Within a cloud environment, compute nodes form a core of resources. They supply the processing, memory, network, and storage that virtual machine instances need. When an instance is created, it is matched to a compute node with the available resources. A compute node can host multiple instances until all of its resources are consumed.

Container. Containers are the products of operating system virtualization. They provide a lightweight virtual environment that groups and isolates a set of processes and resources such as memory, CPU, disk, etc., from the host and any other containers. The isolation guarantees that any processes inside the container cannot see any processes or resources outside the container.

Control Node. Control node is an activity node used to coordinate the flows between other nodes. It includes: initial node, flow final node, and activity final node.

Control plane. The control plane is the part of a network that carries signaling traffic and is responsible for routing. Control packets originate from or are destined for a router. Functions of the control plane include system configuration and management.

Docker. Docker is an open-source project that automates the deployment of Linux applications inside software containers. Docker containers wrap up a piece of software in a complete filesystem that contains everything it needs to run: code, runtime, system tools, system libraries—anything that can be installed on a server. This guarantees that it will always run the same, regardless of the environment it is running in.

Geocasting. Geocasting is the delivery of a message to nodes within a geographical region. It is a specialized form of multicast addressing used by some routing protocols for mobile ad hoc networks.

Georouter. Georouter is a router that allows messages to be sent to all nodes in a specific geographical area using geographic information instead of logical node addresses.

Georouting. Georouting is a routing principle that relies on geographic position information. It is mainly proposed for wireless networks and based on the idea that the source sends a message to the geographic location of the destination instead of using the network address.

Hadoop. Hadoop is an open source, Java-based programming framework that supports the processing and storage of extremely large data sets in a distributed computing environment.

Infrastructure as a Service. Infrastructure as a Service refers to online services that abstract the user from the details of infrastructure like physical computing resources, location, data partitioning, scaling, security, backup etc. A hypervisor, such as Xen, Oracle VirtualBox, Oracle VM, KVM, VMware ESX/ESXi, or Hyper-V, runs the virtual machines as guests.

IPSec tunnel. IPsec is a protocol suite for secure Internet Protocol (IP) communications that works by authenticating and encrypting each IP packet of a communication session. In tunnel mode, the entire IP packet is encrypted and authenticated. It is then encapsulated into a new IP packet with a new IP header.

IP Stack. A protocol stack refers to a group of protocols that are running concurrently that are employed for the implementation of network protocol suite. The protocols in a stack determine the interconnectivity rules for a layered network model such as in the OSI or TCP/IP models. To become a stack the protocols must be interoperable being able to connect both vertically between the layers of the network and horizontally between the end-points of each transmission segment.

Message bus. A message bus specializes in transporting messages between applications. A message bus contains three key elements:

A set of agreed-upon message schemas
A set of common command messages
A shared infrastructure for sending bus messages to recipients OpenStack. OpenStack is a free and open-source software platform for cloud computing, mostly deployed as an infrastructure-as-a-service (IaaS). The software platform consists of interrelated components that control diverse, multi-vendor hardware pools of processing, storage, and networking resources throughout a data center. Users either manage it through a web-based dashboard, through command-line tools, or through a RESTful API. It is a cloud operating system that takes resources such as compute, storage, network, virtualization technologies and controls those at a data center level.

Nova. Nova is a component within the OpenStack open source cloud computing platform developed to provide on-demand access to compute resources by provisioning and managing large networks of virtual machines (VMs). Also known as OpenStack Compute, Nova offers "massively" scalable, on-demand, self-service access to compute resources such as virtual machines, containers and bare metal servers.

O. O is a mathematical notation that describes the limiting behavior of a function when the argument tends towards a particular value or infinity. In computer science, big O notation is used to classify algorithms by how they respond to changes in input size, such as how the processing time of an algorithm changes as the problem size becomes extremely large.

Orchestration. Orchestration is the automated arrangement, coordination, and management of computer systems, middleware, and services.

OS Containers. OS containers are virtual environments that share the kernel of the host operating system but provide user space isolation. OS containers are analogous to VMs. One can install, configure and run different applications, libraries, etc., just as one would on any OS. Just as a VM, anything running inside a container can only see resources that have been assigned to that container. Containers allow code to run in isolation from other containers but safely share the machine's resources, all without the overhead of a hypervisor.

VLAN. VLAN is any broadcast domain that is partitioned and isolated in a computer network at the data link layer. LAN is an abbreviation for local area network. To subdivide a network into virtual LANs, one configures network equipment.

VXLAN. Virtual Extensible LAN (VXLAN) is a proposed encapsulation protocol for running an overlay network on existing Layer 3 infrastructure. An overlay network is a virtual network that is built on top of existing network Layer 2 and Layer 3 technologies to support elastic compute architectures. VXLAN will make it easier for network engineers to scale out a cloud computing environment while logically isolating cloud apps and tenants.

DETAILED DESCRIPTION OF ILLUSTRATIVE EMBODIMENTS

FocusStack System. FIG. 1 is a block diagram of a system for orchestrating edge clouds using location-based focus of attention (FocusStack system 100). The FocusStack system 100 includes a location based situational awareness subsystem (LSA subsystem 101) based on a geocast primitive (geocast system component 102) and including a geocast router 103. The operation of the LSA subsystem 101 is described in more detail below. The FocusStack system 100 also includes an OpenStack extension subsystem (OSE Subsystem 105) that extends OpenStack (an open-source software platform for cloud computing, mostly deployed as an infrastructure-as-a-service (IaaS)) to allow deployment, execution and management of containers on small edge computing devices (e.g. edge device 107 and edge device 109) with limited networking capabilities. The operation of the OSE subsystem 105 is described in more detail below. The FocusStack system 100 forms a hybrid cloud consisting of both edge devices (i.e edge device 107 and edge device 109) running containers 110 (e.g. lightweight Linux containers based on Docker), and cloud-based compute nodes 111 that can run virtual machines (VMs 113) like an IaaS cloud. The FocusStack system 100 may also be used to interact with other devices such as internet of things devices (IoT devices 114 a) or other user devices 114 b such as set top boxes. Only two edge devices are illustrated in FIG. 1, however, it is contemplated that in operation there would be a large number of edge devices, IoT devices and other user devices.

A cloud operation may be invoked by calling the FocusStack API 115 in OSE subsystem 105. The LSA subsystem 101, based on geocast system component 102 including geocast georouter 103, is first used to scope the request. It does so by sending a geo-addressed message (geographic addressing, discussed below) containing details of the desired resource (e.g., what kind of sensors are needed, etc.) to the target area identified by the request, and waiting for responses from the edge devices (e.g. edge device 107 and edge device 109) that satisfy the requirements, and are currently healthy and connected to the network. The resulting "focus of attention" list of edge nodes is then used to seed the appropriate OpenStack operation with the help of conductor 117.

The edge device 107 and the edge device 109 are each provided with a software framework, GCLib 119 and GCLib 121 respectively, providing access to GA messaging, access to sharing of arbitrary data within the device and automatic support for the query/response awareness function. Components of GCLib 119 and GCLib 121 talk to each other via TCP streams over localhost socket connections via defined protocols. Details of the framework for GCLib 119 and GCLib 121 are provided below.

The VMs 113 are provided with an Geocast SAMonitor 125 which is explained below.

LSA Subsystem. The LSA subsystem 101 includes an awareness component based on a field common operating picture algorithm (FCOP algorithm) using geographically addressed (GA) messaging. GA messaging is implemented through the geocast system component 102.

Geographic Addressing. In GA the network delivers a packet to all devices occupying a particular region, termed the geocast region. A geocast region description must include both geometry and location. A geocast region may be circular, described by center coordinates and radius, or any compactly representable subset of space-time. GA is enabled by the increasing ubiquity of location awareness in all devices, which can be leveraged for efficient routing. GA overcomes the inefficiency of traditional routing schemes under conditions of high density, high mobility, or rapidly changing link topologies. In geographic addressing, a packet's address consists of a subset of physical space, with the meaning that the packet will be transferred to all devices currently in that space. A GA service is implemented in the network and appears to the programmer as an API analogous to (and in parallel with) the IP stack. In some implementations, a GA service can even be used in the absence of IP addressing, which can be of significant advantage in settings, such as mobile ad hoc networks, where the overhead of maintaining IP routing tables is onerous.

The other major benefit of using a network GA service to provide location based packet delivery, is that there is a wide variety of location based applications (with more being invented daily); if each has to implement its own method of determining where clients are physically and routing to them, the overhead would be multiplied accordingly.

The primary use of GA in the FocusStack system 100 is to transport query and response messages to, from, and between areas of interest, in order to support the awareness component. However, it is also used for command and control of devices in some cases, such as drones, as well as for distributing information on a per location basis. An example of the latter would be to transmit definitions of areas in which video recording is prohibited to all devices near those areas.

The FocusStack system 100 may utilize a geocast system component 102 to implement a seamlessly integrated, two-tier network GA service. A packet's address, referred to as its geocast region, may be defined by a circle, where the packet header contains latitude and longitude of the center of the circle and the radius. Packets sent via the geocast system component 102 can transit either an ad hoc WiFi tier or a long range tier mediated by an internet-based georouting service accessed through the 3G/4G/LTE/GSM system. Packets can be relayed across either tier or both tiers; in some cases, a packet originating in one ad hoc tier can be transferred to a long range capable device, which will relay it over the long range tier to a device near the destination region, where it will be relayed again across the ad hoc WiFi tier to devices in the region.

Figure 2:
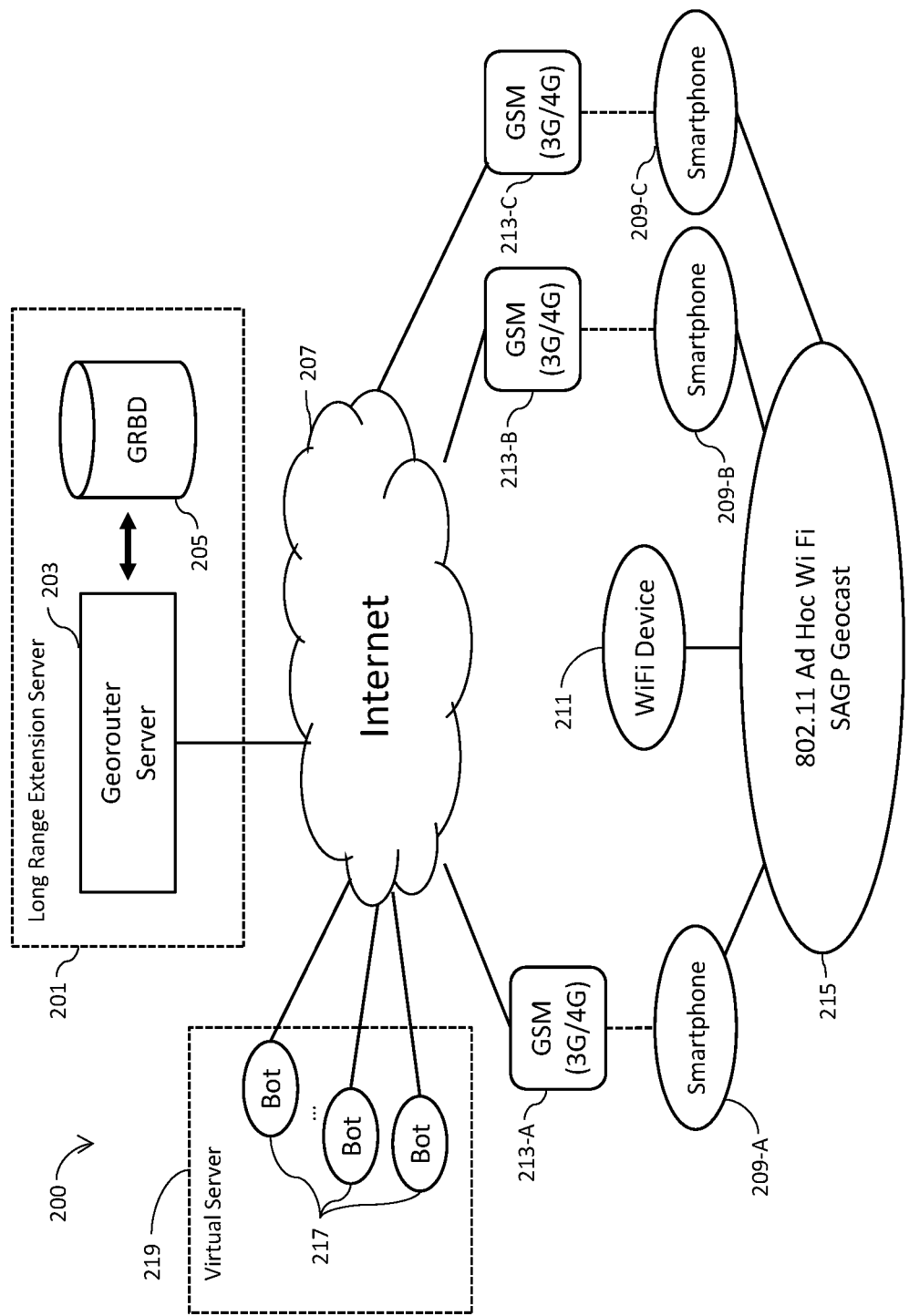
FIG. 2 is a block diagram of an embodiment of a geocast system.

Geocast System. FIG. 2 illustratively depicts an exemplary geocast system 200 that instantiates a scalable geographic addressing framework. Geocast system 200 includes a long-range extension server 201, which includes a georouter server 203, a georouter database (GRDB) 205, a network 207 (e.g. the Internet), User devices (e.g. smartphones 209-A, 209-B and 209-C), WiFi device 211, GSM networks 213-A, 213-B and 213-C, and an 802.11 ad-hoc WiFi (SAGP) geocast 215. SAGP is the acronym for Scalable Ad-hoc Geocast Protocol. In an embodiment, SAGP is used as the geocast protocol within a geocast tier. Any or all of devices, including smartphones 209-A, 209-B and 209-C and WiFi device 211 may be included in a geocast tier implemented over 802.11 ad-hoc mode using the SAGP protocol. Any or all of smartphones 209-A, 209-B and 209-C that connect to network 207 via GSM 213-A, 213-B and 213-C, respectively, may be included in a georouter tier. GSM capable devices (i.e. smartphones 209-A, 209-B and 209-C) can act as bridge devices. WiFi-only devices (i.e. WiFi device 211) are single-tier devices or non-bridge devices.

In the exemplary embodiment of FIG. 2, network 207 is the Internet. In other embodiments, network 207 may include one or more of a number of different types of networks, such as, for example, an intranet, a local area network (LAN), a wide area network (WAN), a wireless network, a Fiber Channel-based storage area network (SAN), or Ethernet. Other networks may be used. Alternatively, network 207 may include a combination of different types of networks.

Geocast system 200 is a multi-tier system including at least two tiers; a georouter tier and a geocast tier. The tiers include devices that occupy only one tier or the other (referred to as non-bridge devices), and bridge devices that occupy two or more tiers. Each tier enables GA within a particular network context. Power and flexibility is gained when multiple tiers work together. This is the role of bridging. A device is a bridge device if it has interfaces to more than one tier concurrently and can send a packet arriving on one of the tiers out on a different tier. For example, smartphones 209-A, 209-B and 209-C can operate on a geocast tier over its 802.11 interface, and also operate concurrently on a georouter tier using their GSM connection 213-A, 213-B, and 213-C, respectively, as shown in FIG. 2. A tier may contain all bridge devices, or it may contain both bridge devices and non-bridge devices. When a device receives a GA packet for the first time on one of its tier interfaces, it uses bridging rules to decide which, if any, of its other tiers to send the device out on. The specific bridging rules used by a given device are described in U.S. Pat. No. 9,363,230 B2.

In systems where devices do not have WiFi capability, the system depends entirely upon the long range tier of the Geocast system 200. An originating client sends the packet up into the Georouter server 203 (via LTE and over the Internet), which determines which devices are in the geocast region and routes copies to each of them. Location and connectivity information are maintained in the georouting database (GRDB 205).

The georouter server 203 is implemented on the long range extension server 201, which is on the open Internet accessible to the devices. The geocast system 200 may also include components (Bots 217), which are only on the georouter tier. Bots 217 operate as non-bridging georouter clients having a footprint of radius 0 around their current (virtual) location and run on a virtual server 219 connected to the network 207.

Figure 3:
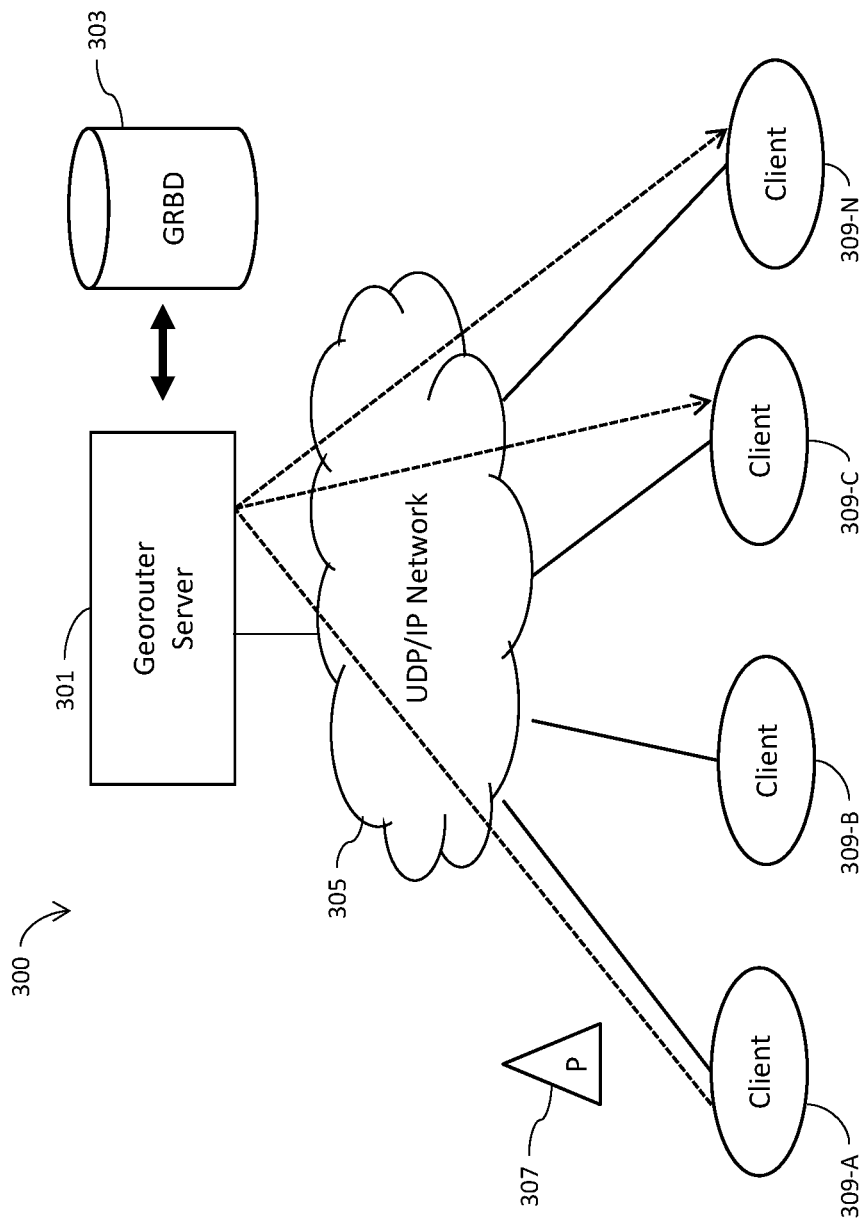
FIG. 3 is a block diagram of an embodiment of georouting tier.

FIG. 3 illustratively depicts an example of a georouter tier. A georouter tier 300 includes a georouter server 301, a georouter database (GRDB) 303, a network 305 such as a UDP/IP Network, a geographic addressing packet 307 and multiple client devices 309-A, 309-B, 309-C, . . . , 309-N. The dashed arrows indicate the processing flow for a geographic addressing packet 307.

For example, client device 309-A may wish to transmit geographic addressing packet 307 to user devices 309-C and 309-N. User device 309-A transmits geographic addressing packed packet 307 to georouter server 301 via network 305. Georouter server 301 uses a suitable instance of a georouting algorithm schema to decide which clients should receive copies of the geographic addressing packet 307. As a result of the algorithm, georouter server 301 determines to transmit the geographic addressing packet to clients 309-C and 309-N. Georouter server 301 then forwards copies to the clients over network 305.

The client devices in FIG. 3 may be bridge devices to one or more geocast tiers. Each client device and each tier accessible to that client device is associated with a tier footprint. The tier footprint is a region description that informs the GRS of the region to which the client device may be able to deliver the geographic addressing packet via other tiers. In particular, if the geocast region of a packet does not intersect any tier footprint of the client device, and if the client device itself is not located in the geocast region, then the GRS may conclude that it need not send the user device a copy of the packet.

FCOP algorithm. In the LSA subsystem 101 of FIG. 1, the awareness component of the FocusStack system 100 is based on a field common operating picture algorithm (FCOP algorithm) which is a distributed algorithm using geographically addressed (GA) messaging. (See, R. Hall, "A geocast based algorithm for a field common operating picture," in Proc. of the 2012 IEEE Military Communications Conference, 2012). The FCOP algorithm is a GA based distributed algorithm designed to enable each device to update all others on its current awareness information in an efficient and scalable manner. More generally, it allows a group M of devices to all monitor the awareness information of a group A of devices. This general case is the monitoring problem. When M=A, (referred to as the common operating picture problem), is a particularly complex case, due to the quadratic number of logical information flows.

Figure 4:
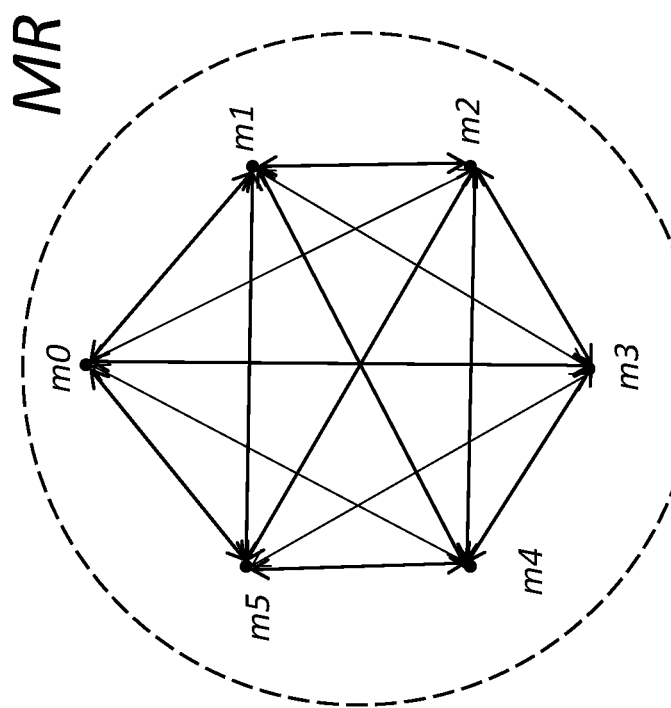
FIG. 4 is a diagram illustrating the number of logical information flows among a plurality of nodes.

FIG. 4 illustrates an example of a FCOP scenario for six devices. As shown in this scenario, because every device provides its updates to every other device, the number of logical information flows per round increases as the square of the number of devices. Thus, for n devices, the number of information flows would be n(n−1). Note that these are logical information flows, in that the information flows from endpoint to endpoint of the paths indicated; however, the flows need not be distinct and separate device-to-device data flows (transmissions), although this is not precluded. To illustrate, device m0 could broadcast information via a single broadcast, which could be received by each of devices m1, m2, m3, m4, and m5. This would constitute 5 logical flows. Alternatively, device m0 could transmit information to each of device m1, m2, m3, m4, and m5, via 5 separate transmissions. This also would constitute 5 logical flows.

FCOP operates as follows on each device. Given a region R and an awareness query spec Q:

Whenever the device has neither sent nor heard-sent a query message directed to a region including R within the last P seconds, it sends a GA message addressed to R containing Q.

Whenever a device receives a query message containing query spec Q, if it has not sent one or more response messages back to a region including the location of the querying device in the last P seconds and containing all the information requested in Q, it formats and sends a query response containing the requested data blocks and directs it to a circle around the querying device. Note that it may have responded multiple times (to multiple queries), each containing part of the requested information and that would count as having responded as well.

Whenever a device receives a query response message containing information it is requesting, it records the information in its operating picture record for that device.

When GA messages are transported over the ad hoc wireless tier, a message can in general be delivered in only O(lg n) transmissions, so the full algorithm's message complexity is O(n lg n) messages. When using the long range tier, since one is required to use unicast User Datagram Protocol (UDP) messages for the last link to each device, the worst case complexity is $O(n^2)$ messages. However, even in that case, the FCOP algorithm minimizes the constants involved in two ways. First, by having the device only send queries when it has not already heard one recently to the same area, there is in general only one query message per P seconds. By having devices accept and record information in the responses to queries issued by other devices, the picture is assembled as quickly as if each device sent its own query, but without the need for all the redundant query messages.

Figure 5:
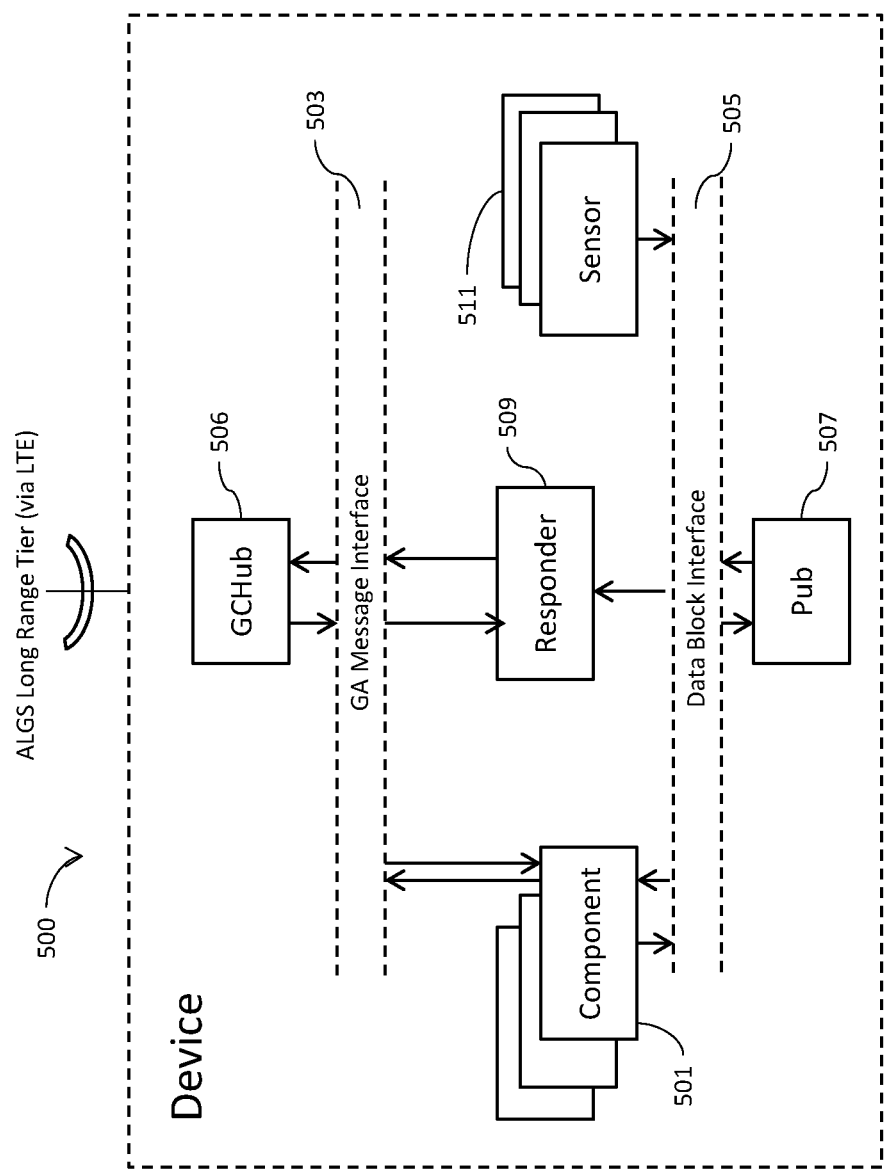
FIG. 5 is a block diagram of an embodiment of a GCLib framework software architecture.

GCLib Framework. GCLib 119 and GCLib 121 (shown in FIG. 1) are software frameworks providing components access to GA messaging, access to sharing of arbitrary data within a device (e.g. a car, drone, etc.), and automatic support for the query/response awareness function discussed below. GCLib framework 500 is shown in FIG. 5. Components 501 of GCLib framework 500 talk to each other via TCP streams over localhost socket connections via defined protocols. These connections are labeled either "GA Message Interface 503" or "Data Block Interface 505" in FIG. 5.

The GCHub 506 mediates access for all other components to the geocast system 200. To send messages, the payload and address information is sent to the GCHub 506 directly. The GCHub 506 then formats the information into a geocast packet and uses the geocast system tiered geocast protocol to send it out. To receive GA messages, each component 501 registers interest with the GCHub by specifying one or more tags (or prefixes of tags); then, when a GA message is received, all components having at least one tag-prefix matching the start of the GA message payload are sent copies of the message.

Pub component 507 implements a publish/subscribe system for data blocks. Essentially, it provides the plumbing for data to flow among components in a fully pluggable way. Each component registers interest in data block tags (or prefixes) and receives a copy each time a component publishes a block update with a matching tag. The Responder component 509 registers interest in incoming query messages and all data block prefixes (i.e., the empty prefix). It does the matching and formulates and sends the response message in conformance with the FCOP protocol. Sensors 511 take measurements and periodically publish their data to the Pub component 507. Other components can use GA messaging and/or Pub data facilities as desired.

Tags, Data Blocks, and Query Specifications. To accommodate arbitrary applications, there is a need to systematize how information is reported over the FCOP algorithm. That is, rather than defining a custom message format for each application, a general tagging and reporting mechanism is provided as follows.

A tag is an ASCII string consisting of non-space characters enclosed in brackets. For example, the [Energy] tag is used to denote a data block transporting the percentage of total energy capacity currently available in a device. As tags are globally defined, in order to scale, a package-format structure, such as [com.att.research.energy]; may be adopted.

A data block is a sequence of bytes that starts with a tag and optionally continues with fields representing information. For example, the energy data block would look like
[Energy]b
Where b is a one byte integer between 0 and 100 representing percentage of capacity. Data blocks can have arbitrarily many fields, including zero. Zero-field blocks can be used to identify simple Boolean properties of the device; for example, in the dashcam example discussed below, if a device has registered the [App.Dashcam] tag, it indicates this device has opted in to participating in a Dashcam application. Similarly, in a drone example, registering [Device.Drone] would label a drone device so that it can be distinguished from cars or other devices.

Data blocks come into being through on-board components, such as sensors 511, publishing them into GCLib's publish/subscribe blackboard, the Pub component 507. (See FIG. 5.) Each time a new sensor value is obtained, the component publishes it under the same data block, and the new value replaces the old one.

A query specification (query spec) is a sequence of tags preceded by a combinator, for example [Q.AND] and [Q.OR] combinatory.

[Q.AND] means that to match the query spec, the Pub component 507 must contain a data block for every tag. For example, to match the [Q.AND][App.Dashcam] [LLA] [Energy] query spec, the Pub component 507 must have all three of [App.Dashcam], [LLA], and [Energy] data blocks. This would request position and energy information from all Dashcam participants in the area of interest.

[Q.OR] means that to match the query spec, the Pub must contain a data block for at least one tag. For example, to match the [Q.OR][Device.Drone][Device.Car] query spec, the device must report either by a car or drone. This would report all drones and cars in the area of interest.

The FCOP algorithm, on receiving a query spec via the GCHub 506 in the payload of a GA message, interprets it, retrieving values from the Pub component 507. In the case of [Q.AND] queries, it must be able to retrieve data blocks for all tags in the spec. For [Q.OR], it only must retrieve at least one such data block. Assuming this matching succeeds, FCOP then formats a query response and sends it out over the GCHub to the region surrounding the querier.

FocusStack Monitoring Component. Each application or service wishing to focus awareness on a region creates a Geocast SAMonitor 125 (shown in FIG. 1), sam. SAMonitor is a network management tool that continuously monitors network devices and services availability both locally or remotely. The application gives sam a circular geographic region, R, defined by a center latitude/longitude pair and radius in meters. It also gives sam a query spec, Q, defining the information to be returned from the devices in the area. In accord with FCOP, sam periodically sends a GA message containing Q to (all devices in) R; each device in possession of information satisfying Q responds by sending a GA message back to a circle containing the querier. In accord with FCOP, by sending replies to a circle around the querier, not only allows for possible mobility of the querier, but in the case of cloud-resident services, this allows all services wishing to monitor R to share both queries and responses, thereby reducing traffic to and from the area. To participate in GA messaging, the application or service must have at least a virtual location and operate as if it is situated physically in the world. The simplest way to do this is to run an instance of GCLib in the service or application and give it a standard location.

Due to the dynamic nature of mobile applications, sam uses response messages to assemble an operating picture of the area of interest. This is a continually updated data set recording the set of devices reporting from the area, the information received from each device, and the age of the information. A client application can make decisions based on information recency, which can improve service quality. Once the service determines that its task in region R is fulfilled, it can deactivate sam, thereby removing the focus of attention and stopping the query and response messages.

Use of Monitoring Within Orchestration. An application needing to perform task within a region sets up an SAMonitor for the region with a query. In the dashcam example discussed below the query may be

[Q.AND][App.Dashcam][LLA][Energy][CompState]

To match this query, a device must first have opted in to the Dashcam service so that it has the [App.Dashcam] tag. Next, it must have position information, in the form of latitude, longitude, and altitude, in order to match the [LLA] tag. It must also have onboard sensors reporting energy and computational state. Note that energy, while not too critical for cars, which have plentiful and renewable battery capacity, is extremely important for drones, which are strongly energy limited. Dashcam can run in cars, drones, or other vehicles or venues; to restrict attention only to a particular device type, one can add a tag, such as [Device.Car], to the above query spec.

The query response will have not only the tags, but the sensed values for each tag type:

[LLA] will include fields reporting the sensed lat/long/alt values;

[Energy] will include device energy level, as a percentage; and

[CompState] will include CPU load average(s) and amount of free memory and storage.

The specific query spec used may be different for different applications. For example, a remote sensing application may request sensor data values other than those above, an auto maintenance application might seek alarm log information, engine temperature data, etc. Our general awareness framework based on arbitrary tags and query specs accommodates a wide range of domains and applications.

Once the operating picture is assembled, the information is handed to the orchestration system to check that the device is capable of executing the task, such as by loading application executable and running it, and satisfies all predefined policy rules, such as authorization granted by the device's owner for executing the task.

Passing these checks, the orchestration system is invoked to carry out the task. In our system, a message is sent to invoke OpenStack mechanisms to accomplish the orchestration action by transporting OpenStack's message bus across a VPN tunnel set up from device to cloud.

OSE Subsystem. In a standard OpenStack environment, VMs are deployed and managed on compute nodes that are full-fledged, heavy weight server machines. This approach is not feasible when the compute nodes are limited edge device platforms. In one embodiment, lightweight Docker containers (containers 110 in FIG. 1) are integrated with the OpenStack management platform. By combining lightweight Docker containers with the OpenStack management platform, the FocusStack system 100 benefits from the portability, security and application isolation of Docker containers while still sharing the rich set of orchestration and management tools available in OpenStack with other typical datacenter applications.

Edge Compute Nodes. Referring again to FIG. 1, compute nodes 111 require several components in order to interact with the FocusStack system 100 architecture. Compute node 111 runs a custom version of Nova Compute that can interact with a local Docker instance 126 running on the compute node 111 to launch and manage containers 110 on edge device 107 and edge device 109. Nova compute service is used for hosting and managing cloud computing systems. Nova is built on a messaging architecture and all of its components can typically be run on several servers. This architecture allows the components to communicate through a message queue. Deferred objects are used to avoid blocking while a component waits in the message queue for a response. The networking layer is provided by Neutron. Neutron is an OpenStack project to provide "networking as a service" between interface devices (e.g., virtual network interface cards) managed by other Openstack services (e.g., nova). When active, Nova reports back to the OpenStack instance over an IPSec tunnel instantiated at bootup time.

Location awareness and messaging is provided by the geocast system 200 (shown in FIG. 2). Devices, such as WiFi device 211 and smartphones 209 A-C use a GPS receiver to track their location and report it to the georouter server 203 to allow geographic addressing over the geocast system 200 long range tier, implemented over LTE.

Figure 6:
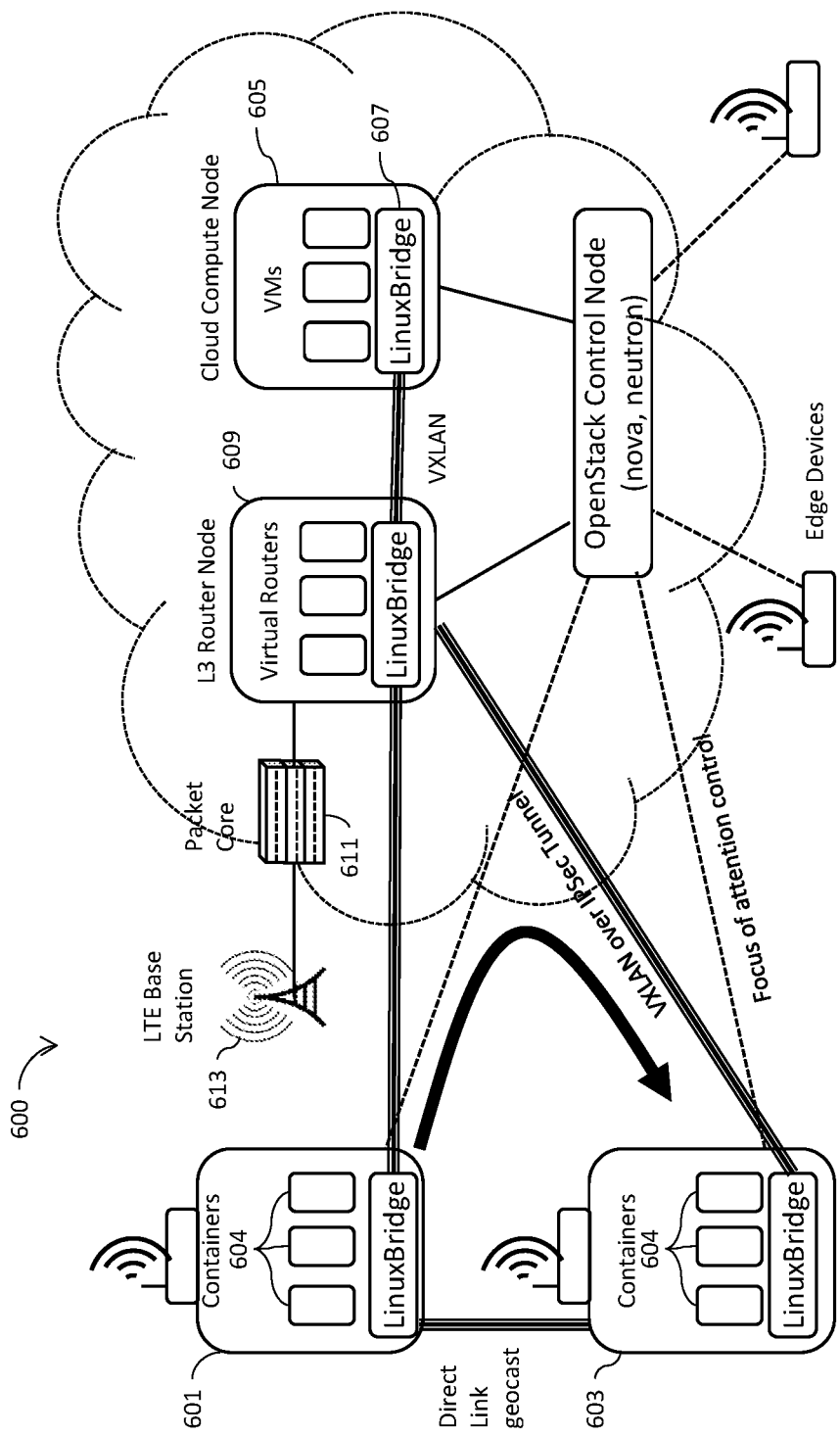
FIG. 6 is a block diagram of an embodiment of the network architecture configured to provide container instances with private connectivity both with other container instances as well as with virtual machines.

FIG. 6 illustrates the network architecture. The edge nodes (e.g. edge node 601 and edge node 603) are provided with containers 604 provided with full OpenStack services, including access to virtual networks that can be configured on a per-application basis. As shown in FIG. 6, these virtual networks can be configured to provide container instances with private connectivity both with other container instances as well as with virtual machines 605 running on regular compute nodes running in the cloud that also belong to the application. The virtual networks are implemented using a control node such as OpenStack's standard LinuxBridge neutron plugin 607 which supports both VLAN as well as VXLAN overlays. All edge node communications, including those between two edge nodes, occur over an IPSec tunnel running over the LTE cellular network that connects the edge node to an OpenStack L3 (layer 3) network node (L3 Node 609) running in the cloud site. L3 node 609 runs virtual routers that enable IP routing to occur between different virtual networks. The architecture of LTE networks, which forces traffic to be aggregated through a packet core aggregated in regional sites precludes local communication between edge nodes over LTE. However, if the edge nodes have direct connectivity via WiFi, they can leverage Geocast's adhoc networking capabilities for direct communication.

Using these facilities, applications can easily start up applications requiring multiple nodes, as well as hybrid applications requiring access to some cloud resources.

Referring again to FIG. 1, there are several cloud components provided by the FocusStack architecture. The Geocast Georouter 103 is part of the LSA subsystem 101 and tracks the location and other metadata about each edge device (e.g. edge device 107 and edge device 109), enabling geographic addressing. An application server 123 makes requests through a FocusStack API 115 to the Geocast SAMonitor 125 and receives a list of available edge nodes in a given geographic area. The decision to include a node within a geographic area is made based on location, speed, heading, altitude or other factors. This list is then sent to the Conductor 117, which is a constraint solving algorithm, for filtering. The Conductor 117 chooses nodes based on their capabilities and resource availability. For example, if an application requires aggregated data from an accelerometer and gyroscope, the Conductor 117 can ensure that only nodes with the correct sensors and adequate storage and cpu for the computations are returned. Once the list of matching nodes is generated, the application server can then select the desired node(s) to deploy the application or present the list to a user for final selection. The OpenStack Nova API 118 is responsible for managing and deploying applications on the selected edge devices.

OpenStack Messaging. OpenStack uses the Advanced Message Queue Protocol (AMQP) as implemented by RabbitMQ as the basis for its messaging platform. RabbitMQ is open source message broker software (sometimes called message-oriented middleware) that implements the AMQP. Many OpenStack components create message queues at initialization time whose routing keys are generic to the component type. For example, an OpenStack compute node such as cloud-based compute nodes 111 in FIG. 1, would create a message queue whose node type is "compute." OpenStack messages directed to a topic exchange (e.g. compute topic) are delivered by the messaging system to all node message queues whose node type corresponds to the topic. The majority of OpenStack messages sent to compute nodes are addressed to the compute topic not to an individual compute node. What this means is that the majority of OpenStack messages sent to compute nodes are multicast to each and every compute node managed by the system. For a traditional cloud data center where there are high speed networking links from OpenStack controller components (e.g. nova scheduler) to tens or at most hundreds of compute nodes, such topic-based message multicasting provides elegant flexibility and decoupling between message publisher and consumer.

Conductor. Aside from the importance of their location and their mobility, edge compute nodes such as cloud-based compute node 111 incorporated in the FocusStack system 100 differ in other important ways from traditional compute resources in a cloud environment. There are a number of additional selection criteria that are used during node allocation such as velocity, energy level, etc. To address the need for this additional filtering, a constraint solving component, Conductor 117, is provided which may be a scalable deployment decision maker for cloud services in large-scale cloud data centers. Conductor 117 efficiently searches for the optimal deployment of cloud resources that meets a given set of constraints and service owner requirements. In order to incorporate the constraint solving component of Conductor 117 into the IoT application space, e.g., the Shared Dashcam service discussed below, Conductor 117 selects among edge compute nodes (such as edge device 107 and edge device 109) on the basis both of available traditional cloud resource metrics (CPU, storage, battery energy, etc.), and also in accordance with IoT application specific constraints (sensor type availability, node owner policy).

The FocusStack system 100 can be deployed on an unmodified installation of OpenStack, and can deploy applications that are packaged as Docker lightweight OS container instances to "compute nodes" running on small-form factor devices. Each application container can access a full suite of cloud capabilities including the ability to create private and public virtual networks as well as direct access to cloud resources colocated with the controller nodes including cloud storage and VM instances that provide additional compute capabilities.

Examples. FocusStack system 100 can be used to manage clouds that comprise a variety of endpoint types with a range of characteristics:

a) Customer premise devices such as set-top boxes, edge routers, or WiFi access points are increasingly built using general purpose CPUs such as Atom (an Intel microprocessor) or ARM and run commodity operating systems such as Linux (e.g., DD-WRT, a GNU/Linux-based firmware for wireless routers and access points). Providers may call on these devices to provide a number of services ranging from usage analytics to environment sensing. While these devices have limited compute and memory capabilities, they generally have good network connectivity and power, and are not mobile.

b) Cars are rich sensor platforms not just for the wealth of data they directly collect on engine performance, but also because of their ability to measure their environment including factors such as weather, traffic conditions, terrain (potholes, etc.), and driving habits. A number of parties including auto manufacturers, city planners, insurance companies, as well as drivers themselves can benefit from analytics based on car sensor data. In addition to constraints on compute and memory, cars have additional challenges due to mobility and variable network connectivity.

c) Finally, drones are the ultimate mobile platforms, with energy constraints and extreme variability in network conditions as they fly in and out of radio range. General purpose drone platforms can be useful both as a video-acquisition platform for hire, as well as environmental sensing and tracking. The following are examples of the applications of the FocusStack system 100.

Car diagnostics Example. An example application is in car diagnostic services. For example, a car company may want to understand how the cold temperatures affect engine performance. While it is not feasible (for volume and privacy reasons) to continuously upload detailed diagnostics data from all cars at all times, it is possible to write a simple onetime app to read specific CAN bus data and run analytics to estimate engine performance. The car company may use a FocusStack system 100 to deploy the app to a small sample of cars in a limited geographic location. When the study is complete, the app is no longer needed, and can be removed from the cars.

Viewership Analytics Example. In another example, a content provider may want to understand differences between TV viewing habits of their LA and NYC viewers. Using the geoaddressing primitives of the FocusStack system 100, the content provider can identify and deploy two Hadoop instances in their target regions, each with their own virtual networks. Then, using a simple map-reduce job whose mappers measure channel change events, and whose reducers compute aggregate statistics, the content provider can compute the aggregate results they need without ever collecting individual users' TV viewing history.

Drones For Hire Example. In another example, a service company may operate a fleet of connected drones equipped with cameras and environmental sensors. These drones wait for remote sensing jobs to be submitted over the Internet. Each job is represented by a target area the drone must fly to along with an app that the drone should run when it arrives at the target area. Once at the target area, the app is authorized to collect and analyze data from the drone's camera and sensors in real time, and potentially adjust the drone's flight plan based on its analysis. On receiving the job, the service company can use the FocusStack system 100 to identify a drone that is close to the target area and has enough energy left, and deploy the app to it.

Shared DashCam Example. A Shared Dashcam service allows subscribers to watch real-time video generated either by dashcams in on-road connected vehicles or in flying drones. The term "vehicle" may refer to both on-road connected vehicles and to flying drones. An application subscriber selects what video source to watch based largely on the geolocation and video camera orientation of other participating vehicles. Such vehicles have a FocusStack device installed and are connected to the Internet using cellular LTE data service. Participating vehicles are owned by drivers who have agreed to share video from the dashcam that is part of the edge computing platform installed in their vehicles.

One application of the dashcam example is avoiding long lines at the Department of Motor Vehicles (DMV). For example, a user may need to get a yearly car inspection at the DMV. one potential obstacle may be long lines at the DMV. With the shared DashCam app on a user's tablet, the user can query for participating vehicles who are in the vicinity of the closest inspection station and who are able and willing to share their video at the current time. Shared Dashcam responds with a map centered on the inspection station superimposed with visual "push-pins" representing available edge nodes, one of which is an edge compute node in another user's car. The user can then tap on the other user's node icon to have the FocusStack system 100 deploy a Shared Dashcam container to the other user's car and send the user the video feed. After watching the video from the other user's dashcam for a short while and monitoring the other user's speed, the user may conclude that the line at the inspection station is moving slowly, and decides to wait until the next day to try again.

Another application example may be a user that wants to see fall colors. The user may want to go to the location having the peak colors. The user can use Shared DashCam to call up video from cars and drones running the FocusStack system 100 in a couple of the areas the user is considering before deciding whether it is worthwhile to drive there.

Another application is to provide the capability of watching an event using a drone. For example, a group of people may want to watch an event that they cannot attend personally. Only authorized drones are allowed to fly over the area. If an entity is flying authorized drones over the area, providing video from a selection of viewpoints then Dashcam remote users can select from among the available device feeds to watch the event, based on desired angle, distance, etc.

Another application is a dashcam service that allows subscribers to watch real-time video generated either by dashcams in on-road connected vehicles or in flying drones.

Applications to support shared dashcam service use cases are interesting edge computing systems because their design and implementation require that desired resources be located in the face of edge nodes that are mobile and have limitations in their network connectivity.

Unlike the compute nodes in a cloud data center, the resource of primary interest in the shared dashcam service is video sources; in particular, active video sources near a particular geolocation pointed at interesting things. Which video sources are in which location right now is a dynamic property of the service because nodes move around. In fact, it is almost exclusively video sources which are right now or have recently been mobile that are of the most interest. A parked car is usually turned off and thus its dashcam is also powered off, and, even if the dashcam were on and the video available, a static view from a garage or parking spot is unlikely to be of much interest to other subscribers. The fact that nodes move around independently of one another also stresses the networking design. Since the video sources (vehicles) for the shared dashcam service are outside most of the time, accurate geolocation is reliably implemented using GPS and networking is based on cellular LTE data service. However, even in today's smartphone focused world, reliable, robust cellular data service is not always present, and when it is, connectivity to the Internet is characterized by Network Address Translation (NAT) and changing public IP addresses.

The geocast system implements geographic addressing and is therefore specifically designed to accommodate computing nodes that are mobile, that are ephemerally connected and whose underlying network addresses change. However, the video streaming feature of the Shared Dashcam system is built upon standard Transmission Control Protocol (TCP) networking and is quite fragile with respect to ephemeral node network presence and changes of underlying public IP addresses. Because of the network address translation present in cellular data carrier networks, the problem of edge nodes' changing IP addresses is even harder since the edge device itself is unaware of the IP address change. It uses the private IP address that was given to it via the carrier operated Dynamic Host Configuration Protocol (DHCP) service when the device initially started up.

Figure 7:
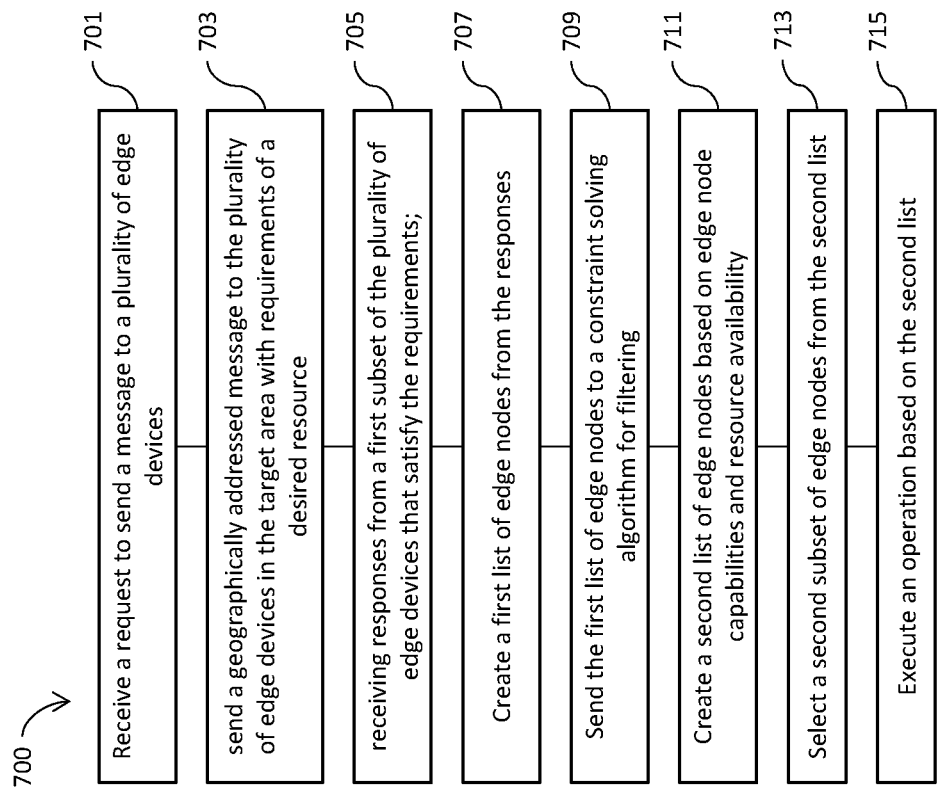
FIG. 7 is a flow chart of a method for orchestrating edge clouds using location based focus of attention.

Method Implemented by FocusStack System. Illustrated in FIG. 7 is a method 700 implemented by the FocusStack system 100.

In step 701 the FocusStack system 100 receives a request to send a message to a plurality of edge devices.

In step 703 the FocusStack system 100 sends a geographically addressed message to a plurality of edge devices in the target area with a requirement of a desired resource.

In step 705 the FocusStack system 100 receives responses from a first subset of the plurality of edge devices that satisfy the requirements.

In step 707 the FocusStack system 100 creates a first list of nodes from the responses.

In step 709 the FocusStack system 100 sends the first list of edge nodes to a constraint solving algorithm for filtering. The algorithm searches for optimal deployment of cloud resources that meets a given set of constraints and service owner requirements.

In step 711 the FocusStack system 100 creates a second list of edge nodes based on edge nodes capabilities and resource availability. The FocusStack system 100 may also create a second list of edge nodes based on application-specific constraints or traditional cloud resource metrics such as CPU, storage, battery energy, etc.

In step 713 the FocusStack system 100 selects a second subset of edge nodes from the second list.

In step 715 the FocusStack system 100 executes an operation based on the second list. The operation may be deploying an application through containers or presenting a second list of edge nodes to a user for selection by the user.

Figure 8:
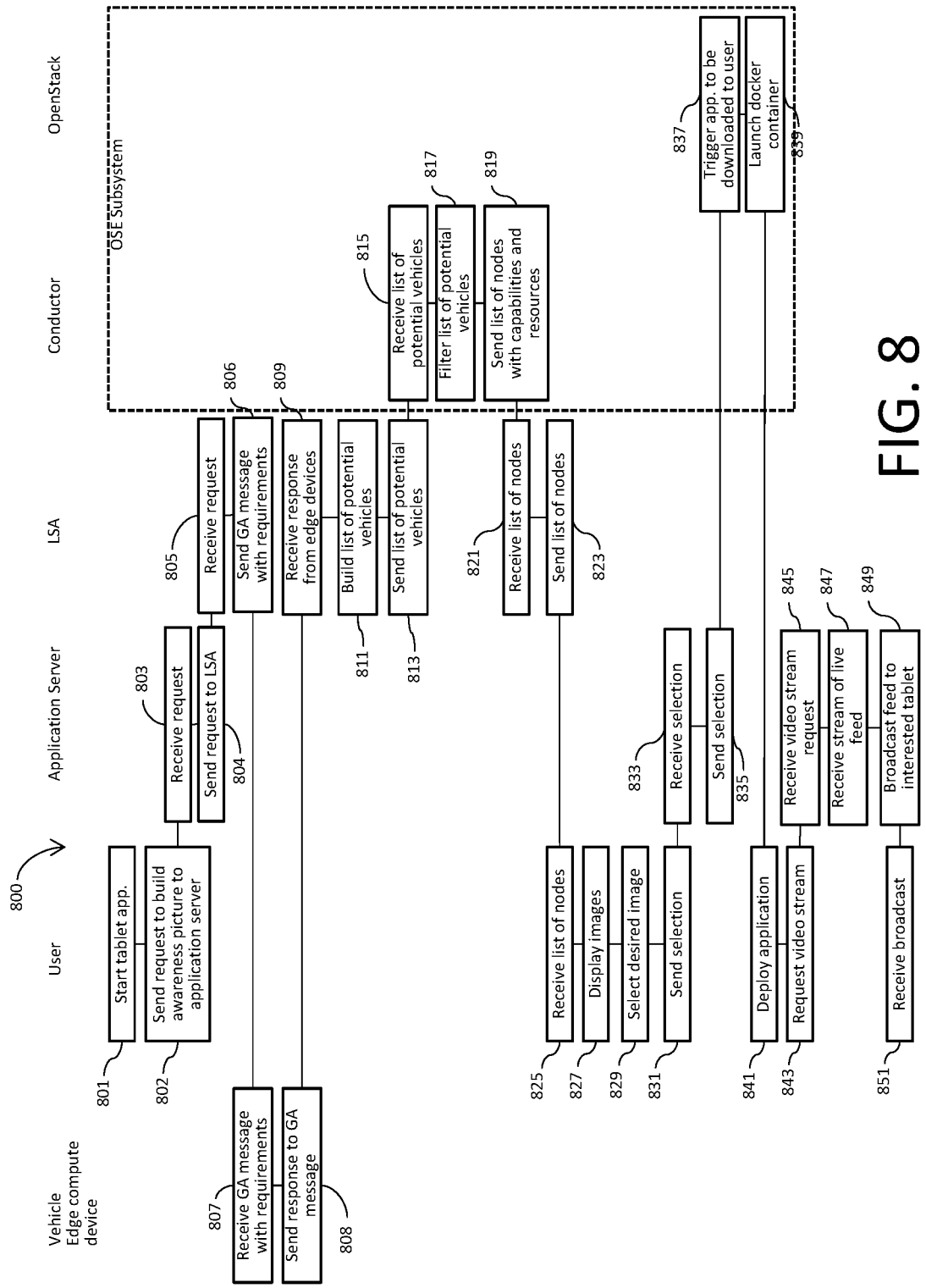
FIG. 8 is a flowchart of an embodiment of a method for orchestrating dashcams in a shared dashcam service.

Dashcam Application Implementation. In order to evaluate the architecture of the FocusStack system 100 for orchestrating edge clouds using location-based focus of attention (FocusStack) consider a shared dashcam service. FIG. 8 illustrates a method 800 for orchestrating edge clouds using location-based focus of attention in a dashcam application implementation.

The edge device may be a Raspberry Pi 2 Model B running Ubuntu Mate 15.10. The Raspberry Pis may be augmented with a 5 MP, 1080p camera, GPS receiver and LTE dongle. The hardware may be installed in a plurality of target vehicles, running off of a car battery. The camera may be mounted on the rearview mirror to provide a view of the road ahead. The edge compute device powers on when the car is started and shuts down after the key is removed from the ignition.

The base software on the edge device may include a Docker instance, the GCLib software architecture implemented in Java, and a paired down version of Nova compute. Initially, there is limited network traffic between the device and the cloud. Infrequent awareness updates are sent through Geocast to keep track of the location and availability of the device. In a full deployment of this system there could be thousands or millions of these devices, but none of them interact with the cloud infrastructure until they are required by another user of the application.

The user interface may be an Android application running on a tablet mounted in the vehicle. The user interface may be separated from the rest of the DashCam hardware to allow the flexibility of viewing shared video from outside the vehicle, for example, at home waiting for traffic to clear.

The method 800 is initiated with step 801 where the user starts a tablet application.

In step 802 a request is sent to the application server to build an awareness picture of the area of interest.

In step 803 the application server receives the request from the user tablet application.

In step 804 the application server sends the request to build an awareness picture of the area of interest to the LSA subsystem 101.

In step 805 the LSA subsystem 101 receives the request to build an awareness picture of the area of interest.

In step 806 the LSA subsystem 101 sends a GA message with requirements for building the awareness picture of the area of interest to a plurality of vehicle edge compute devices.

In step 807 the vehicle edge compute devices receive the GA message.

In step 808 the vehicle edge compute devices send GA message responses to the LSA In step 809 the LSA subsystem 101 receives the responses from the edge devices.

In step 811 the LSA subsystem 101 builds a list of potential vehicle edge devices whose current awareness information shows they are willing to share their video and are within a specified radius (e.g. 10 Km).

In step 813 the LSA subsystem 101 sends the list of potential vehicle edge devices whose current awareness information shows they are willing to share their video and are within the specified radius to the conductor 117 in the OSE subsystem 105.

In step 815 the conductor 117 receives the list of potential vehicle edge devices.

In step 817 the conductor 117 filters list of potential vehicle edge devices to return only nodes that have the required capabilities and resources.

In step 819 the conductor 117 sends the list of nodes that have the required capabilities and resources to the LSA subsystem 101.

In step 821 the LSA subsystem 101 receives the list of nodes that have the required capabilities and resources.

In step 823 the LSA subsystem 101 sends the list of nodes that have the required capabilities and resources to the user.

In step 825 the user receives a list of nodes that have the required capabilities and resources.

In step 827 vehicles reported by the LSA subsystem 101 SAMonitor picture that survived the filtering phase are displayed on a map interface to the user with a thumbnail image of the current camera view.

In step 829 the user selects the desired image.

In step 831 the user sends the selection to the application server.

In step 833 the application server receives the selection.

In step 835 the application server sends the selection to the open stack component of the OSE subsystem 105.

In step 837 the open stack component of the OSE subsystem 101 triggers the application to be downloaded to the edge device in the target vehicle.

In step 839 the OpenStack component of the OSE subsystem launches a Docker container and deploys the application to the user.

In step 841 the application is deployed at the user device.

In step 843 the user requests a video stream from the application server 123.

In step 845 the application server 123 receives the video stream requests.

In step 847 the application server 123 receives a stream of life feed.

In step 849 the application server broadcast the feed to the user.

In step 851 the user receives the broadcast on the user device.

Dashcam can run on a Raspberry Pi mounted on a drone. Of course, there is no onboard consumer of video, but the same approach to dynamic sourcing of its onboard camera video applies as in the car case. The LSA subsystem 101 awareness picture now includes the altitude in addition to position, and the filtering by Conductor may include reasoning about available [Energy] by extending LSA subsystem 101's query spec to include that tag.

Benefits of LSA. If one assumes that 1/k of all the IoT devices in the world are within an area of interest for some incident or task, then a factor of k bytes per P seconds per application (both transmitted over LTE and processed by the service) may be saved by using the location based awareness system of the FocusStack system 100 instead of full-time active monitoring. As the number of IoT applications across many different IoT devices classes increases, these savings become even more significant when multiplied by the number of applications and the number of devices.

As a simple example, one may assume that all cars on U.S. roads become Dashcam devices, and ignore all other IoT devices. One may further assume that the number of cars on U.S. roads stays the same as today, approximately 253 million. There are approximately 5100 accidents per day in the U.S. as of 2005. Further assumptions are that Dashcam users are interested in all and only the traffic accidents and the area of interest for an accident covers 1000 cars and the time of interest lasts 2 hours per accident.

Using full-time active awareness monitoring, as would be normal in data center computing clusters, approximately 560 trillion bytes must be transferred per day across U.S. LTE systems and processed by the Dashcam server per day, assuming awareness packets of 256 bytes and P=10 sec. However, using the FocusStack system 100 location based awareness monitoring only during the times of interest, only 9.4 billion bytes need be transferred and processed, yielding a savings multiplier of k=59, 574.

As described above, the exemplary embodiments can be in the form of processor-implemented processes and devices for practicing those processes, such as a server in a regional network or cloud data center. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed:

1. A method comprising:
   receiving, via an Application Programming Interface (API) by a processing system including a processor, a request to build an awareness picture of an area of interest;
   sending, by the processing system, a geographically addressed message to a set of edge devices in a geocast region defined by the area of interest, wherein the geographically addressed message contains a set of requirements of a desired resource;
   obtaining, by the processing system, responses that satisfy the set of requirements;
   determining, by the processing system, a first list of edge devices that satisfy the set of requirements from the responses;
   obtaining, by the processing system, a second list of edge devices having capabilities and resource availability to satisfy the set of requirements, wherein the second list of edge devices is derived from filtering of the first list of edge devices using a constraint solving algorithm; and
   sending, by the processing system, the second list of edge devices to an end user device, wherein a selection at the end user device of an edge device from the second list of edge devices facilitates a download of an application at the edge device.

2. The method of claim 1, wherein the second list of edge devices are displayed on a map interface of the end user device.

3. The method of claim 1, wherein the obtaining the second list of edge devices is from a cloud computing platform executing the constraint solving algorithm, and further comprising sending, by the processing system, the first list of edge devices to the cloud computing platform.

4. The method of claim 1, wherein the second list of edge devices is based on traditional cloud resource metrics.

5. The method of claim 1, wherein the set of edge compute devices is a set of vehicles.

6. The method of claim 1, wherein the download of the application at the edge device is managed by a compute node that launches and manages containers on edge devices.

7. The method of claim 1, wherein the constraint solving algorithm searches for optimal deployment of cloud resources that meets a given set of constraints and service owner requirements.

8. A non-transitory computer-readable storage medium having a tangible physical structure, the computer-readable storage medium comprising executable instructions that when executed by a processor cause the processor to perform operations comprising:

receiving a request to build an awareness picture of an area of interest;

sending a geographically addressed message to a set of edge devices in a geocast region defined by the area of interest, wherein the geographically addressed message contains a set of requirements of a desired resource;

obtaining responses that satisfy the set of requirements;

determining a first list of edge devices that satisfy the set of requirements from the responses;

obtaining a second list of edge devices having capabilities and resource availability to satisfy the set of requirements, wherein the second list of edge devices is derived from filtering of the first list of edge devices using a constraint solving algorithm; and sending the second list of edge devices to an end user device to facilitate a download of an application at an edge device selected from among the second list of edge devices, wherein the download is managed by a compute node that launches and manages containers on edge devices.

9. The non-transitory computer-readable storage medium of claim 8, wherein the second list of edge devices are displayed on a map interface on the end user device.

10. The non-transitory computer-readable storage medium of claim 8, wherein a selection at the end user device of an edge device from the second list of edge devices facilitates the download of the application at the edge device.

11. The non-transitory computer-readable storage medium of claim 8, wherein the second list of edge devices is based on traditional cloud resource metrics.

12. The non-transitory computer-readable storage medium of claim 8, wherein the set of edge compute devices is a set of vehicles.

13. The non-transitory computer-readable storage medium of claim 8, wherein the obtaining the second list of edge devices is from a cloud computing platform executing the constraint solving algorithm, and wherein the operations further comprise sending the first list of edge devices to the cloud computing platform.

14. The non-transitory computer-readable storage medium of claim 8, wherein the constraint solving algorithm searches for optimal deployment of cloud resources that meets a given set of constraints and service owner requirements.

15. A device comprising:

a processing system including a processor; and a memory that stores executable instructions that, when executed by the processing system, facilitate performance of operations, the operations comprising:

receiving a request from an end user device to build an awareness picture of an area of interest;

sending the request to a location based situational awareness subsystem (LSA) to cause the LSA to obtain a second list of edge devices having capabilities and resource availability to satisfy a set of requirements, wherein the second list of edge devices is derived from filtering of a first list of edge devices using a constraint solving algorithm, wherein the first list of edge devices is determined based on satisfying the set of requirements from responses obtained to a geographically addressed message sent to a set of edge compute devices in a geocast region defined by the area of interest, wherein the geographically addressed message contains the set of requirements of a desired resource;

receiving, from the end user device, a selection of an edge device from the second list of edge devices that is provided to the end user device by the LSA; and sending the selection of the edge device to a cloud computing platform to facilitate a download of an application at the edge device.

16. The device of claim 15, wherein the second list of edge devices are displayed on a map interface on the end user device.

17. The device of claim 15, wherein the second list of edge devices is based on traditional cloud resource metrics.

18. The device of claim 15, wherein the set of edge compute devices is a set of vehicles.

19. The device of claim 15, wherein the obtaining the second list of edge devices is from a cloud computing platform executing the constraint solving algorithm, and wherein the LSA sends the first list of edge devices to the cloud computing platform.

20. The device of claim 15, wherein the constraint solving algorithm searches for optimal deployment of cloud resources that meets a given set of constraints and service owner requirements.

* * * * *